Figure 1:
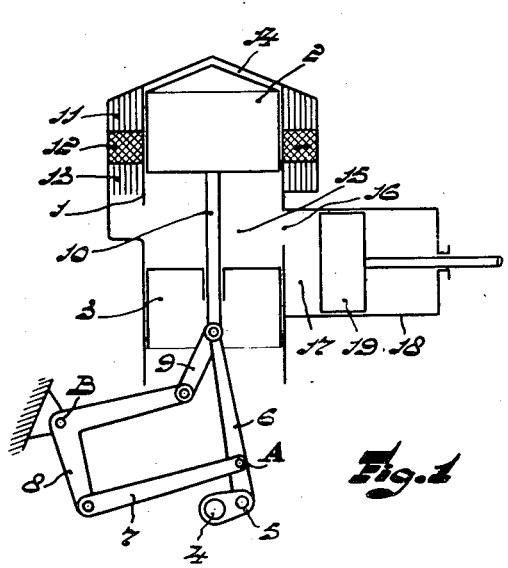

July 8, 1952   H. RINIA ET AL   2,602,288
HOT-GAS PISTON ENGINE WITH POWER OUTPUT CONTROL
Filed Aug. 31, 1945

INVENTOR
HERRE RINIA &
HEINRICH DE BREY

BY *E. F. Wenderoth*
ATTORNEY

Patented July 8, 1952

2,602,288

UNITED STATES PATENT OFFICE 2,602,288

HOT-GAS PISTON ENGINE WITH POWER OUTPUT CONTROL

Herre Rinia and Heinrich de Brey, Eindhoven, Netherlands, assignors to Hartford National Bank & Trust Co., Hartford, Conn., as trustee Application August 31, 1945, Serial No. 613,947
In the Netherlands March 5, 1943

Section 1, Public Law 690, August 8, 1946
Patent expires March 5, 1963

4 Claims. (Cl. 60—24)

The present invention relates to improvements in hot-gas engines, and more particularly to means for varying the power output of the same through volume changes of a working cylinder or cylinders to predetermined levels which may be characterized as being in a series of equal steps or otherwise, such as in irregularly valued predetermined increments.

A hot-gas engine is to be understood to mean a thermodynamic power machine in which a thermodynamic cycle is traversed by an amount of gas enclosed in space-forming means having a variable volume. This space-forming means contains a heating portion or is in open communication with a heating portion and, if desired, with a regenerator. Also a cooling portion may be included but it is either located in a second space or in open communication with a second space having a variable volume. The space adjoining the heating portion is termed "hot space or chamber" and that adjoining the cooling portion is termed "cold space or chamber."

A portion of the amount of gas enclosed in the said spaces, if desired, may be admitted into one or more separate closed tubes or vessels and afterwards readmitted into the said spaces from one or a plurality of these tubes or vessels. In all these cases the thermodynamic cycle is termed a "closed cycle."

If desired, the cooling portion of the engine may be omitted and replaced by a periodic communication with the atmosphere, in which case a new amount of air is drawn in for each cycle. Such motors are termed "open cycle engines." With open cycle engines as well as with closed cycle engines there exists between the variations in volume of the hot and the cold spaces a phase difference which is such that the gas is subjected consecutively to heating, expansion, cooling and compression.

Previous hot-gas engines did not provide any way of regulating its output by altering the characteristics of the thermal cycle of these engines.

Therefore, a principal object of this invention is to provide means for adjusting the output of a hot-gas engine.

Further objects and advantages of the invention will, in part, be obvious and, in part, will appear more clearly hereafter.

Figure 2:
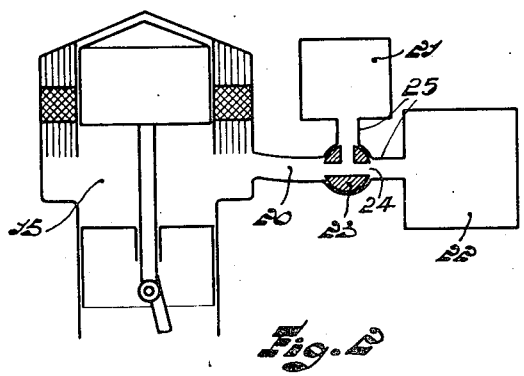

In the drawing:

Fig. 1 shows a schematic view in elevation of one embodiment of the invention; and Fig. 2 shows a similar view of another embodiment of the invention.

Generally speaking, this invention contemplates means for varying the mechanical power output of a hot-gas engine by varying the amount of gas medium within the usual cold chamber or chambers in each cycle of engine operation. Broadly characterized the invention accomplishes this desirable result by selectively coupling one or more normally inactive spaces or initially thermally inert chambers with a cold chamber. In order to realize this function in more detail, the invention utilizes either one or more chambers or cylinders connectible or coupled to the parallel walls of the engine cylinder through conduit or connective means, and in the event only one cylinder or chamber is used, a plunger, piston or selective means is inserted therein whereby the volume of the cold chamber can be effectively increased in steps totaling one greater than the number of movements of the selective means. However, if a plurality of distinct chambers are used, more than one conduit or connective means must be joined at a juncture provided with selective means in the form of special valve means. Of course, a main conduit must be joined to the engine proper in the cold chamber region or zone. Provision for detachability of these parts from the engine proper is easily provided by the very nature of the inventive concept. The various cylinders or distinct chambers may be either all of the same size or graduated sizes in a series arrangement or they can be arranged in an irregularly valued series of volumes.

Referring to Fig. 1 the engine and its power output varying means are succinctly described from a schematic view point with the engine in elevation because mechanical details are unnecessary for an understanding of this invention. The engine includes a cylinder 1 in which a hot piston or a displacer piston 2 and a working piston 3 can move. An engine shaft 4 of the engine is connected to the working piston 3 via the crank 5 and the driving rod 6. In order to obtain the phase displacement between the motions of displacer piston 2 and working piston 3, which is necessary for the operation of the motor, the motion of displacer piston 2 is derived from the motion of working piston 3 through a lever system. To this end, a lever 7 at a point A is connected to the driving rod 6 and also coupled to one arm of a knee-lever 8. This lever 8 can turn about a fixed point B and is connected at its other end, via coupling element 9, to the driving rod 10 of displacer piston 2, driving rod 10 being led in a gas-tight manner through an aperture provided in working piston 3. Cylinder 1 is surrounded respectively by a heater 11, a regenerator 12, and a cooler 13. The medium can pass from a hot space 14 of the motor to a cold space or chamber 15 solely through these members. By means of a conduit or connective means 16, cold space 15 communicates with space 17 of variable volume in a cylinder 18, whose contents are variable in steps by means of a piston 19. Moving this piston more or less far in cylinder 18 results in a decrease or an increase of the volume of the clearance space of the motor, due to which its output is increased or reduced with otherwise unvaried conditions.

Fig. 2 shows another form of construction of the motor according to the invention. In this case the motor proper is constructed in the same manner as in Fig. 1 so that a description thereof may be omitted. By means of a conduit or connective means 20, cold space 15 communicates with auxiliary spaces or distinct chambers 21 and 22, the volumes of which may vary from each other, if desired, and which together or each separately may be brought in communication with the working space 15 of the motor by means of a three-way cock or selective means 23 having channels 24 which may selectively be interconnected with conduits 25 of chambers 21 and 22, respectively. The advantage of this form of construction over that shown in Fig. 1 is that the variation of volume of the spaces to be added to the motor involves practically no work. It is evident that it is alternatively possible to add only one of the auxiliary spaces 21 and 22 to a hot-gas motor, in which case the control of the output by means of the clearance space to be added can take place in only one step.

Other advantages and uses of the invention will readily be apparent to those skilled in the art.

What we claim is:

1. In a hot-gas engine, cylinder means, a displacer and a piston mounted in said cylinder means for reciprocatory movement therein, a common crankshaft, means linking said displacer and said piston to said crankshaft for permitting reciprocatory movement of said displacer and said piston 90° out of phase with respect to each other, a working cold chamber defined in part by said displacer and said piston, a plurality of distinct chambers in an initially neutral energy state, main connective means coupled to said cold chamber, a plurality of connective means interposed between said main connective means and said distinct chambers to form a juncture, selective valve means placed at said juncture, said valve means having a plurality of ports therein and being movable to a plurality of positions for selectively connecting said main connective means to any or all of said plurality of connective means whereby the volume of said cold chamber can be effectively increased in steps to so vary the work output of the hot-gas engine with minimal thermal loss.

2. In a hot-gas engine, cylinder means, a displacer and a piston mounted in said cylinder means for reciprocatory movement therein, a common crankshaft, means linking said displacer and said piston to said crankshaft for permitting reciprocatory movement of said displacer and said piston 90° out of phase with respect to each other, a cold space defined in part by said displacer and said piston, a plurality of initially thermally inert chambers, a main engine conduit connected to said cold space, a plurality of supplementary conduits each of said supplementary conduits connected at one end to one of said chambers and at the other end joined to said main conduit at a common juncture, and selective valve means movable within said juncture, said selective valve means comprising a movable element having a plurality of connective passages which are movable to a plurality of positions for selectively connecting said main engine conduit to any or all of said plurality of supplementary conduits whereby the clearance of said engine is effectively adjustable in various stages to so vary the work output of the hot-gas engine with minimal thermal loss.

3. In a hot-gas engine, cylinder means, a displacer and a piston mounted in said cylinder means for reciprocatory movement therein, a common crankshaft, means linking said displacer and said piston to said crankshaft for permitting reciprocatory movement of said displacer and said piston 90° out of phase with respect to each other, a working chamber defined in part by said displacer and said piston, a cylinder defining a second chamber and arranged adjacent to said working chamber, engine gas conduit means from said cylinder to said working chamber, and piston means within said cylinder for producing a series of volumes additive to the varying volumes within the said chambers to so vary the work output of the hot-gas engine with minimal thermal loss.

4. In a hot-gas engine, cylinder means, a displacer and a piston mounted in said cylinder means for reciprocatory movement therein, a common crankshaft, means linking said displacer and said piston to said crankshaft for permitting reciprocatory movement of said displacer and said piston 90° out of phase with respect to each other, a cold chamber defined in part by said displacer and said piston, separate chamber means for confining a volume of gas located externally of said cylinder means, means for connecting said chamber means with said cold chamber, and means for varying the effective volume of said chamber means.

HERRE RINIA.
HEINRICH DE BREY.

REFERENCES CITED

The following references are of record in the file of this patent:

UNITED STATES PATENTS

| Number | Name | Date |
|---|---|---|
| 1,504,101 | Davidson | Aug. 5, 1924 |
| 1,579,782 | Riesner | Apr. 6, 1926 |
| 1,997,476 | Wallene | Apr. 9, 1935 |